(12) United States Patent
Oliveira Da Mata (10) Patent No.: US 12,110,847 B2
(45) Date of Patent: Oct. 8, 2024

(54) METHOD FOR CONTROLLING MIXING RATIO BY THERMAL ACTION IN THE PROPELLANT TANKS OF SPACE SYSTEMS

(71) Applicant: COMANDO DE OPERAÇÕES AEROESPACIAIS—COMAE, Brasília (BR)

(72) Inventor: Henrique Oliveira Da Mata, Brasília (BR)

(73) Assignee: COMANDO DE OPERAÇÕES AEROESPACIAIS—COMAE, Brasília (BR)

( * ) Notice: Subject to any disclaimer, the term of this patent is extended or adjusted under 35 U.S.C. 154(b) by 0 days.

(21) Appl. No.: 18/248,800

(22) PCT Filed: Oct. 16, 2020

(86) PCT No.: PCT/BR2020/050417
§ 371 (c)(1),
(2) Date: Apr. 12, 2023

(87) PCT Pub. No.: WO2022/077079
PCT Pub. Date: Apr. 21, 2022

(65) Prior Publication Data
US 2023/0374953 A1 Nov. 23, 2023

(51) Int. Cl.
*F02K 9/56* (2006.01)
*F02K 9/42* (2006.01)
*B64G 1/40* (2006.01)

(52) U.S. Cl.
CPC ............... *F02K 9/56* (2013.01); *F02K 9/425* (2013.01); *B64G 1/401* (2013.01)

(58) Field of Classification Search
CPC .................. F02K 9/425; F02K 9/56
See application file for complete search history.

(56) References Cited

U.S. PATENT DOCUMENTS

| 4,722,183 A | 2/1988 | Hughes |
| 5,058,834 A | 10/1991 | Hubert |

(Continued)

FOREIGN PATENT DOCUMENTS

| CN | 102926889 A | 2/2013 |
| CN | 103017852 A | 4/2013 |

(Continued)

OTHER PUBLICATIONS

WIPO, International Search Report (in a counterpart application), Mar. 12, 2021.

(Continued)

*Primary Examiner* — William H Rodriguez
(74) *Attorney, Agent, or Firm* — Laurence P. Colton; Smith Tempel Blaha LLC (57) ABSTRACT

A method, which uses real pressure, temperature and mass data obtained from real telemetry, to control the mixture ratio based on the change of the temperature set in its tanks, where the mixture ratio is defined by the ratio between the oxidant mass consumption by the fuel mass consumption. To achieve this, the space system in question must have a bipropellant propulsion system operating in blow-down mode containing independent temperature control systems for each tank. The method is related to the aerospace field, the application of this method is of interest to the areas of manufacturing and operation of space systems.

19 Claims, 7 Drawing Sheets

(56) References Cited

U.S. PATENT DOCUMENTS

| | | | |
|---|---|---|---|
| 5,148,674 | A | 9/1992 | Morris |
| 5,251,852 | A | 10/1993 | Pulkowski et al. |
| 5,880,356 | A | 3/1999 | Delepierre-Massue et al. |
| 5,954,298 | A | 9/1999 | Basuthakur et al. |
| 6,755,378 | B2 | 6/2004 | Capozzi et al. |
| 2016/0238505 | A1 | 8/2016 | Honda et al. |

FOREIGN PATENT DOCUMENTS

| | | | |
|---|---|---|---|
| CN | 103344292 | A | 10/2013 |
| CN | 103453963 | A | 12/2013 |
| CN | 106114909 | A | 11/2016 |
| CN | 107702758 | A | 2/2018 |
| CN | 107832487 | A | 3/2018 |
| CN | 109405918 | A | 3/2019 |
| CN | 109407719 | A | 3/2019 |
| CN | 110566369 | A | 12/2019 |
| KR | 100985741 | B1 | 10/2010 |
| WO | 8700816 | A1 | 2/1987 |
| WO | 2014058503 | A2 | 4/2014 |

OTHER PUBLICATIONS

WIPO, Written Opinion (in a counterpart application), Feb. 21, 2021.

METHOD FOR CONTROLLING MIXING RATIO BY THERMAL ACTION IN THE PROPELLANT TANKS OF SPACE SYSTEMS

CROSS REFERENCE TO RELATED APPLICATIONS

This application is the U.S. National Phase of and claims the benefit of and priority on International Application No. PCT/BR2020/050417 having a filing date of 16 Oct. 2020.

BACKGROUND OF THE INVENTION

Technical Field

The present invention patent application relates to a method, which uses real pressure, temperature and mass data obtained from real telemetry, to control the mixture ratio based on the change of the temperature set in its tanks, where, for the purposes of the present patent application, the mixture ratio is defined by the ratio between the oxidant mass consumption by the fuel mass consumption.

To achieve this, the space system in question must have a bipropellant propulsion system operating in blow-down mode with independent temperature control systems for each tank.

The present patent application is related to the Aerospace field, the application of this method is of interest to the areas of Manufacturing and Operation of Space Systems.

Prior Art

The patent reference U.S. Pat. No. 6,755,378B2—System and Method for Controlling a Space-Borne Propulsion System—presents the state of the art of space propulsion system performance parameter control using a system and method based on the thermal actuation of a propellant tank using the ideal gas equation as a qualitative model PV=nRT.

The patent reference KR 100985741B1—The satellite thruster system pressurized with electrical motor pump—presents the use of a satellite propulsion system pressurized by an electric pump, allowing pressure control on the thrusters for the best use of the available propellant.

The patent reference U.S. Pat. No. 5,251,852A—Thermal Fuel Transfer and Tank Isolation to Reduce Unusable Fuel, presents propellant transfer by thermal actuation, in which the different heating between two propellant tanks of the same propulsion system leads to a pressure gradient between the tanks in order to transfer propellant from one to the other.

The patent reference WO 87000816A1—Bi-Liquid Propulsive System for an Artificial Satellite and Utilization of Said System for Ejecting the Satellite—presents a bipropellant propulsion system for artificial satellites and the use of this system in the context of satellite end-of-life. In this patent, two pairs of tanks are filled unevenly in such a way that, when the tanks in short supply are exhausted, there is still propellant available in the tanks in excess to perform the end-of-life maneuver.

The patent reference WO 2014/058503A2—Estimation of Propellant Remaining in a Satellite—presents a method for estimating the propellants available on a satellite based on obtaining pressure and temperature telemetry data from its propellant tanks.

The patent reference U.S. Pat. No. 5,880,356A—Device for pressurizing a unified two-liquid propulsion subsystem geostationary satellites—presents equipment capable of ensuring, during the orbital transfer phase, pressurization in the tanks of a bipropellant system and, during the operational phase, repressurization of the tanks and measurement of the available propellants.

The patent reference U.S. Pat. No. 6,755,378B2 uses the concept of thermal actuation on a propellant tank of a monopropellant propulsion system in order to keep the pressure in this tank at acceptable levels for maintaining the propulsive efficiency of the system. For this purpose, it uses as a performance parameter the efficiency in the generation of impulse ($\Delta V$). This is very relevant in space systems with only one tank (monopropellants) where this is the main lifetime limiting factor. In monopropellant systems, a greater pressure drop in the tanks is expected over the lifetime, implying a significant loss of performance. But when considering larger systems with two or more tanks (bipropellant), the pressure drop is not so significant as to seriously impair the thrust efficiency. Therefore, in bipropellant systems, it is not enough to analyze the efficiency in generating thrust, but mainly the consumption ratio between the propellants. This consumption ratio, called mixture ratio, must be controlled in such a way in order to reduce the excess of one of the propellants when the other is exhausted, that is, to reduce the residue. The residue occurs because the consumption rate of each propellant depends on the pressure found in the propellant tanks. As the propellant is consumed, the free volume in the tank increases, reducing the pressure in the tanks. This pressure reduction leads to a reduction in the rate of consumption of this propellant. And as each tank will have a different reduction in pressure over time, the consumption rate will also occur differently, leading to the existence of residual propellants. That is, the existence of propellant residue at the end of life has a more significant impact on the shortening of the operational life in bipropellant space systems than the decrease of efficiency in the generation of thrust.

The solution proposed by patent reference KR 100985741B1 is a possible alternative for pressure control and, consequently, the rate of consumption of propellants in bipropellant systems. However, there is a need for a simpler solution, since the solution proposed in patent reference KR 100985741B1 demands the addition of electric pumps and other equipment that would add structural mass to the platform, and which are not normally reliably available in long-lived space systems.

Patent reference U.S. Pat. No. 5,251,852A presents a possibility of using temperature control to change the pressure between two tanks of the same propellant and transfer propellants between them. However, this solution is not intended to control the pressure ratio in a pair of bipropellant tanks, which, in turn, would enable the control of consumption rates in order to reduce propellant residue at the end of life.

In the patent reference WO 87000816A1, the proposed system can guarantee the availability of enough propellants for the end-of-life maneuver in bipropellant propulsive systems. But the proposed system does not pay attention to the amount of residual propellant after the end-of-life maneuver.

Patent reference WO 2014/058503A2 indicates a solution for calculating the propellant mass as a function of pressure and temperature data contained in the free volume of a tank. In order to estimate the amount of residual propellant in tanks at the end of life, there is a need to establish a simple solution for identifying pressure as a function of temperature and mass data.

The patent reference U.S. Pat. No. 5,880,356 (A) proposes a solution for the operation of the propulsion system in pressurized mode even after the transfer phase from the continuous use of the pressurizing gas. But the same reference also points out the risks related to deficiencies in valves and seals. In case of problems, the pressurizing gas supply system is isolated, changing the operation of the propulsive subsystem to blow-down mode. With this, pressure control in the tanks would be lost and, therefore, the possibility of optimizing the performance of the propulsion system. In addition, this reference also does not pay attention to the issue of propellant dynamic residue and the need to control the mixture ratio.

BRIEF SUMMARY OF THE INVENTION

The amount of propellant is a fundamental resource in a satellite. Once placed in orbit, a satellite normally cannot be refueled. Therefore, the functional life of a satellite directly depends on the amount of propellant available in the satellite. Most satellites remain useful and therefore are not replaced by new satellites until their propellant runs out. A satellite is normally designed to carry enough propellant to last through its lifetime, plus enough additional propellant to move it out of its service orbit at the end of its operational life.

The most frequent cause of a satellite reaching the end of its life is therefore the satellite using up all the propellant that allows it to maintain position and continue pointing towards Earth.

Modern satellites use bipropellant propulsion systems, based on the use of two liquid propellants with separate fuel and oxidizer tanks. This propulsion system is used for reasons of profitability throughout the life of the satellite, in order to achieve the following objectives: early in the satellite's life, to circularize its orbit and to position it in its orbit; orbit control; and orientation control.

Conventional bipropellant propulsion systems usually contain two tanks of the same diameter to store the propellant contained therein. Since the tanks generally have the same volume, the available fuel mass is different from the oxidizer mass because they have different densities.

Depending on the consumption rates of each propellant, the mass of propellant in one of the tanks may be depleted before the mass of the other propellant. This surplus mass is called dynamic residue. The smaller the dynamic residue, the greater the availability of propellants and, consequently, the greater the lifetime of the space system.

The lowest residue is achieved if the propellant mass consumption rates have a proportional ratio to the available mass ratio in the tanks. This ratio of mass consumption rates (oxidant to fuel) is called the mixture ratio.

The mixture ratio is related to the fluid pressures encountered in the feed lines. In turn, the pressure in the line is directly related to the pressure in its tank. Consumption of propellant mass increases the free volume in the tank. When operating in blow-down mode, there is no addition of pressurizing gas in the tanks and, therefore, the increase in free volume leads to a decrease in the internal pressure of the tank. That is, in this mode, the pressure in the tank tends to decrease as quickly as the propellant consumption is faster. And since the consumption of each propellant (oxidizer and fuel) occurs unevenly, pressure changes unevenly, resulting in the mixture ratio varying over time. As discussed previously, when consuming the propellants with a mixture ratio different from the ratio of masses available in the tanks, residues are expected to remain at the end of the life of the space system.

The motivating problem of this invention is that long-lived space systems (such as geostationary satellites) normally do not have a dedicated system for pressure control during their operational phase.

In the present invention, a method based on the performance of the thermal system that defines the temperatures of each tank is presented. Since the thermodynamic quantities pressure and temperature are closely related, thermal actuation allows the adjustment of pressures so that the operation of the thrusters occurs under a chosen mixture ratio.

Therefore, the present invention uses maximum likelihood estimators to identify the parameters that relate the pressure, mass and temperature data. In this way, it becomes possible to predict the pressure value based on the available mass and the temperature to be adjusted.

The present invention also uses maximum likelihood estimators to identify the parameters that relate the mixture ratio of propellant consumption with the pressures in the tanks. In this way, it becomes possible to predict the value of the mixture ratio based on the pressure pair in the propellant lines.

Considering both relations (pressure as a function of temperature and mixture ratio as a function of pressure), it is possible to describe the direct relations for calculating the mixture ratio as a function of the control temperature of the tanks. In addition, it is also possible to describe the inverse relations for calculating the temperature as a function of the mixture ratio. Therefore, the present invention shows a method that identifies the temperature to be adjusted through thermal action in the propellant tanks as a function of the chosen mixture ratio.

Implementations of the present invention may include, but are not limited to, systems and methods having one or more features as described herein, as well as equipment capable of obtaining and analyzing the data or enabling one or more machines (e.g., computers, etc.) to result in the operations described herein.

In short, the present invention allows the control of the mixture ratio of propellant consumption at a selected value from the identification of the temperature to be adjusted. That is, by changing the thermal control bands for the identified temperatures, it is possible to operate the satellite with a given mixture ratio.

Knowing the motivation and the concept behind the solution, following is how the present patent application solves the main technical problems existing in the prior art.

With respect to patent reference U.S. Pat. No. 6,755,378B2, the present patent application solves the problem of the existence of the dynamic residue found in bipropellant systems. This is only possible because the present patent application relates the thermal actuation in the tanks to the control of the mixture ratio. This allows the dynamic residue to be minimized or even eliminated, leading to an increase in the operational lifetime of the bipropellant space system.

With respect to patent reference KR 100985741B1, the present patent application solves the limitation of adding new equipment since it uses the performance of the temperature control subsystem already existing in space systems. That is, it is not necessary to add new equipment, but to use it to improve the performance of the propulsion subsystem.

With respect to patent reference U.S. Pat. No. 5,251,852A, the present patent application solves the design distinction of differential heating made for equal propellant tanks for the purpose of transferring propellants between them. In the case of the present patent application, differential heating is designed for tanks of distinct propellants in order to pressurize them independently with the purpose of controlling the mixture ratio of the consumption of these propellants.

With respect to patent reference WO 87000816A1, the present patent application solves the problem of dynamic residue by allowing the consumption of propellants at a mixture ratio proportional to the amount of propellant available in the tanks.

With respect to patent reference WO 2014/058503A2, the present patent application solves the difference by basing in its qualitative model the calculation of the pressure knowing the temperature and the mass of propellant available and estimating the parameters using real telemetry data.

With respect to patent reference U.S. Pat. No. 5,880,356A, the present patent application solves the limitation of adding new equipment and, unlike the reference, allows the control of performance parameters (such as mixture ratio) even in blow-down mode.

BRIEF DESCRIPTION OF THE DRAWINGS

The annexed figures, which incorporate and form part of this specification, show certain aspects of the solution in this document and, by their description, help explain some of the principles associated with the proposed implementations.

FIG. 4 shows a pair of plots showing the relations between pressure as a function of temperature for various mass values of a propellant pair (FIG. 4a for MON-1 oxidizer and FIG. 4b for MMH fuel).

FIG. 5 shows a pair of plots comparing the actual pressure data obtained by telemetry from a satellite with the predicted pressure values according to Step 1 in FIG. 2, i.e., using the parameters estimated from a previous set of pressure, temperature and mass telemetry for the tank with oxidant (FIG. 5a) and for the fuel tank (FIG. 5b).

Where possible, similar reference numbers denote similar structures, characteristics, or elements.

DETAILED DESCRIPTION OF PREFERRED EMBODIMENTS

Figure 1:
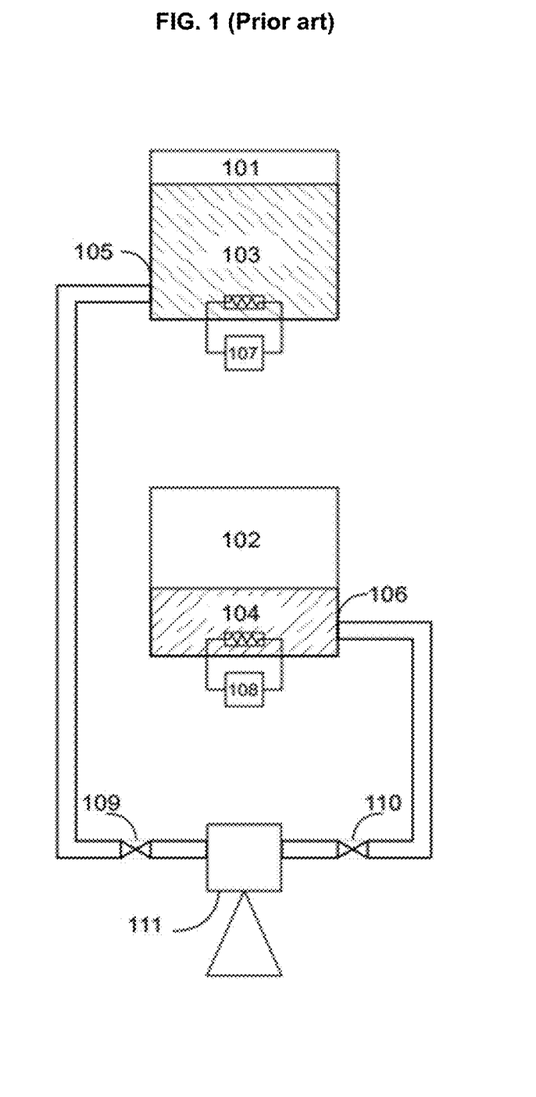
FIG. 1 shows a diagram illustrating characteristics of a conventional propulsion system, having two distinct propellant tanks (bipropellant), being an oxidizer tank and another fuel tank, which feed one (or more) rocket engine. Both tanks have independent equipment for thermal control.

FIG. 1 illustrates parts of a satellite propulsion system including two separate propellant tanks (105) and (106) that store propellants and are pressurized by an inert gas (e.g., helium gas He). The tank (105) stores a quantity of oxidant (103) (e.g., MON-1 nitrogen tetroxide) and is pressurized by a quantity of pressurizing gas (101). The tank (106), on the other hand, stores a quantity of fuel (104) (for example, monomethyl hydrazine MMH) and is pressurized by another quantity of pressurizing gas (102).

Due to the difference in the amount of mass in each tank, as well as the difference in density of the propellants, only part of the total volume of each tank ($V_0$) is occupied. In this way, the free volume (U) is filled by the available pressurizing gas and the vapor of the respective propellant.

Both tanks (105) and (106) have supply lines to feed the rocket engine propulsion assembly, represented by engine (111). The high pressure in the tanks leads to a pressure differential that induces the flow of propellants toward the engine (111). The flow is controlled by means of the oxidizer line valve (109) and the fuel line valve (110), both dual state (open or closed) that act in a synchronized manner. When opening the valves, the mixture of the hypergolic liquids in the engine (111) consumes a certain amount of propellant generating the required thrust. For the purposes of the present patent application, the referred propellant consumption is characterized by the ratio between the oxidant mass consumption by the fuel mass consumption, being the referred ratio called Mixture Ratio (MR), that is, the Mixture Ratio (MR) is defined by the ratio between the oxidant mass flow ($dm_{ox}$) and the fuel mass flow ($dm_{co}$), that is, $MR = dm_{ox}/dm_{co}$ The flow rate of each propellant is related to the pressure couple in the propellant supply lines (p). This ratio is usually provided by the engine manufacturer, based on bench tests of that batch and unit. However, operation of this engine may not occur as specified for several reasons. First, it should be considered that the operation of the motors is usually done in pulsed mode (Pulse Mode Firing) and not in continuous mode (Steady State Firing). This allows better control of the intensity of the thrust generated by the motor on the space system. Secondly, the system may behave outside of what is expected after passing through the launch and the in-orbit positioning phases. Finally, it should be considered that typically a propulsive system contains more than one thruster, causing the combined operation of these thrusters to perform differently than expected from individual test data.

The pressure found in the supply line (p) is related to the pressure in the propellant tanks (P). A pressure drop is expected due to the bends, corners, and devices (valves, sensors, etc.) present along the supply line. Piping designs of propulsive systems usually seek to minimize these pressure losses. Therefore, in this document the values of both pressures will be considered equal (p=P). For designs where the loss is significant, there is a need to calculate the pressure in the supply line as a function of the pressure in the tank and the expected pressure loss ($\Delta P = p - P$).

Method Overview

Figure 2:
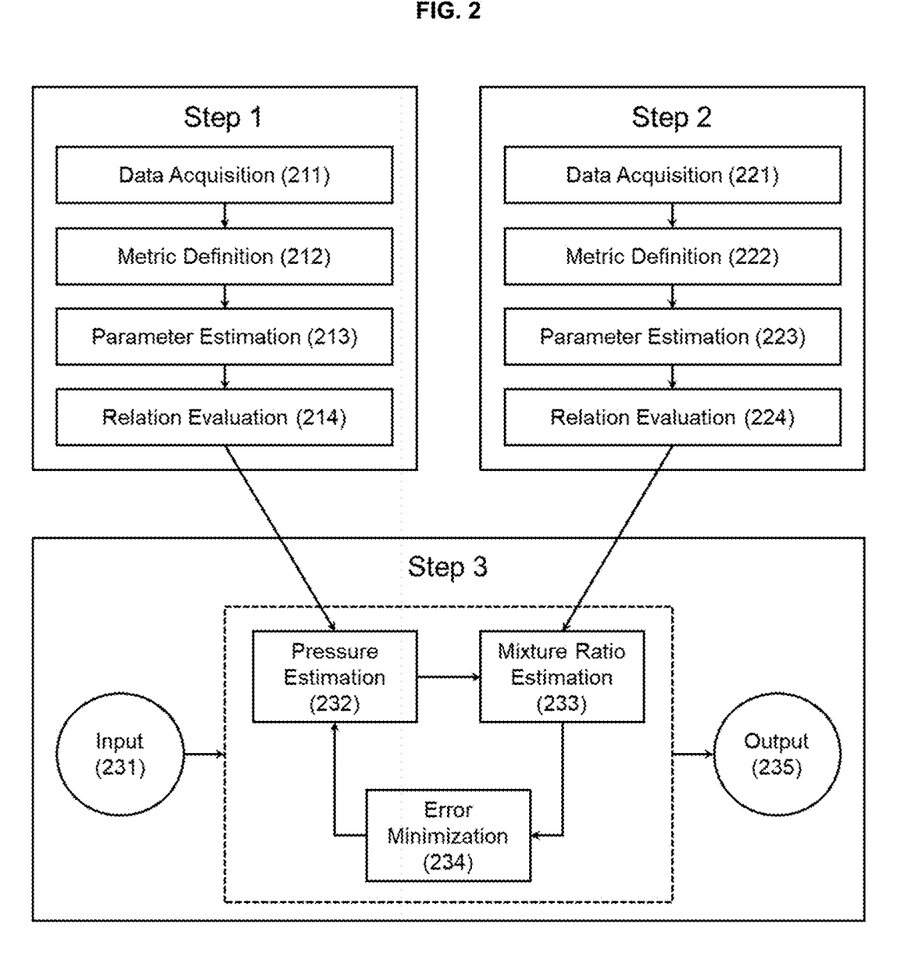
FIG. 2 shows a flow chart illustrating the three Steps of the method described in the present patent application for calculating the temperature that causes the propulsion system to operate at the desired mixture ratio.

FIG. 2 shows the Method proposed in this patent application. The Method allows, from the use of real data of pressure, temperature and mass obtained from real telemetry, to perform the control of the mixture ratio of propellant consumption from the change of the temperature set in their tanks. The Method comprises three Steps, as follows: Step 1—Obtaining the Pressure versus Temperature relations-P(T), Step 2—Obtaining the mixture Ratio Relation as a Function of Pressure-MR(P), and Step 3—Obtaining the Temperature to be Set ($T_A$) for mixture Ratio Control. It is worth mentioning the possibility of the Method, the object of this patent application, being implemented by means of a computer program.

Qualitative models are proposed from the natural laws that govern the system. Each model has unknown parameters that represent the specific characteristics of the space system. Thus, parameter identification techniques are used to find the parameters that fit the qualitative model to the actual telemetry data while minimizing errors. The model fitted with the estimated parameters relates several physical quantities of interest to this patent application and will therefore be called "Relation". The values of physical quantities predicted by a relation will be more accurate the better its model represents the natural laws that govern the system. The distinction between the concepts of qualitative model and relations is fundamental to the understanding of Steps 1 and 2.

Step 1 is called "Obtaining the Pressure versus Temperature Relation-P(T)". This step consists in, from a qualitative model, using a set of telemetry data from the space system to obtain the mathematical relation that allows to calculate the pressure as a function of an adjusted temperature in the propellant tanks. Step 1 comprises the sub-steps of Data Acquisition (211), Defining the Metric (212), Parameter Estimation (213), and Relation Evaluation (214).

Step 2 is called "Obtaining the Mixture Ratio Relation as a Function of Pressure-MR(P)". This step consists in, from a qualitative model, using a set of telemetry data from the space system to obtain the mathematical relation that allows to calculate the mixture ratio of consumption as a function of pressure in the propellant tanks. Step 2 comprises the sub-steps of Data Acquisition (221), Metric Definition (222), Parameter Estimation (223), and Relation Evaluation (224).

Step 3 is called "Obtaining the Temperature to be Set ($T_A$) for Mixture Ratio Control". This is the final step of the Method and consists in using both relations obtained in Steps 1 and 2 in a recursive way, in order to find the temperature that leads the system to operate at a given mixture ratio of interest. In this step, the relations are sequenced, yielding the Direct Relation of the Mixture Ratio as a function of Temperature-MR(T). A search algorithm is used to "invert" this relation, leading to the Inverse Relation of the Temperature as a function of Mixture Ratio-T(MR). From the application of a value of Mixture Ratio of Interest ($MR_I$) as Input (231) in the T(MR) relation, one finally obtains in Output (235) the temperature to be set ($T_A$). The result obtained in Output (235) of Step 3 is also the final result of the Method. That is, by thermally acting on the propellant tanks of space systems, the temperature (T) will be regulated to the value of the temperature to be set ($T_A$) obtained in Output (235) of Step 3 and, as a result, the mixture Ratio (MR) is controlled to an Adjusted Mixture Ratio ($MR_A$). By using the relations found in Steps 1 and 2, the Method ensures that the difference between Adjusted Mixture Ratio ($MR_A$) and the mixture Ratio of Interest ($MR_I$) tends to zero. Step 3 comprises the Input (231), the Sub-step of Pressure Estimation (232), the Sub-step of Mixture Ratio Estimation (233), the Sub-step of Error Minimization (234), and the Output (235).

Note that Stages 1 and 2 are independent of each other and can be calculated in one of the ways listed as follows: a) sequentially; b) simultaneously; or yet c) with the beginning of any of the two stages without necessarily the conclusion of the other previously started. However, Step 3 necessarily can only be started after the complete conclusion of both Step 1 and Step 2.

It is emphasized that it is expected that this temperature to be set ($T_A$) will be outside the conditions already used in the operation of the space system. That is, the use of a model that best represents the behavior of the system is essential for a more comprehensive application of the estimated parameters beyond the point of operation, allowing the search on a broader spectrum of temperatures with greater accuracy of the final result.

In the next paragraphs, all the steps and sub-steps mentioned will be described, as well as the theoretical basis for applying the Method.

Preliminarily, for the purpose of the Method, object of the present patent application, it is important to define "operator" as well as its role in the Method. The operator is the agent responsible for performing the Steps and Sub-steps of the Method in order to control the mixture ratio of the space system to a value of interest. To do so, this operator can make use of computational tools that automate part or the totality of the Method.

Table 1 is the "Table of variables for the estimations" and it presents the glossary of variables and parameters that are used during the parameter estimations proposed in the Method estimation Sub-steps. Table 1 is presented below:

TABLE 1

Table of variables for estimations

| | |
|---|---|
| P | Actual pressure in propellant tank |
| $\tilde{P}$ | Pressure telemetry in the propellant tank |
| P* | Best estimate of the actual pressure in the propellant tank |
| T | Actual temperature in the propellant tank |
| $\tilde{T}$ | Telemetry of the temperature in the propellant tank |
| M | Actual propellant mass in the tank |
| $\tilde{M}$ | Telemetry of the propellant mass in the tank |
| $M_0$ | Mass calculated during estimation, used as a metric |
| $n_{He}$ | Number of moles of pressurizer (He) in the tank |
| e | Volumetric elasticity coefficient of the tank |
| $K_M$ | Subsystem parameters vector (for Mass estimation) |
| $K_M^*$ | Best estimate of the subsystem parameters vector |
| $MR_P$ | Mixture ratio calculated from the pressure equation |
| $\widetilde{MR}_P$ | Mixture ratio calculated by the pressure equation with telemetry data |
| $MR_M$ | Mixture ratio calculated by mass consumption |
| $\widetilde{MR}_M$ | Mixture ratio calculated by mass consumption with telemetry data |
| $K_{MR}$ | Propulsion parameters vector (for mixture Ratio estimation) |
| $K_{MR}^*$ | Best estimate of the propulsion parameters vector |

Theoretical Foundation for Step 1

Initially, it is necessary to create a qualitative model that describes the relation between pressure and temperature pertinent to Step 1.

The values of pressure P in the oxidant tank (105) and in the propellant tank (106) are given by the pressure of the gas mixture present in their respective free volume (U). For tank (105) this mixture consists of the pressurizing gas (101) and the oxidizer vapor, and for tank (106) this mixture consists of the pressurizing gas (102) and the fuel vapor. Once the tank is filled and isolated, the sequence of equations present in FIG. 3 can be applied in order to relate the pressure (301) to the temperature in the tanks.

Figure 3:
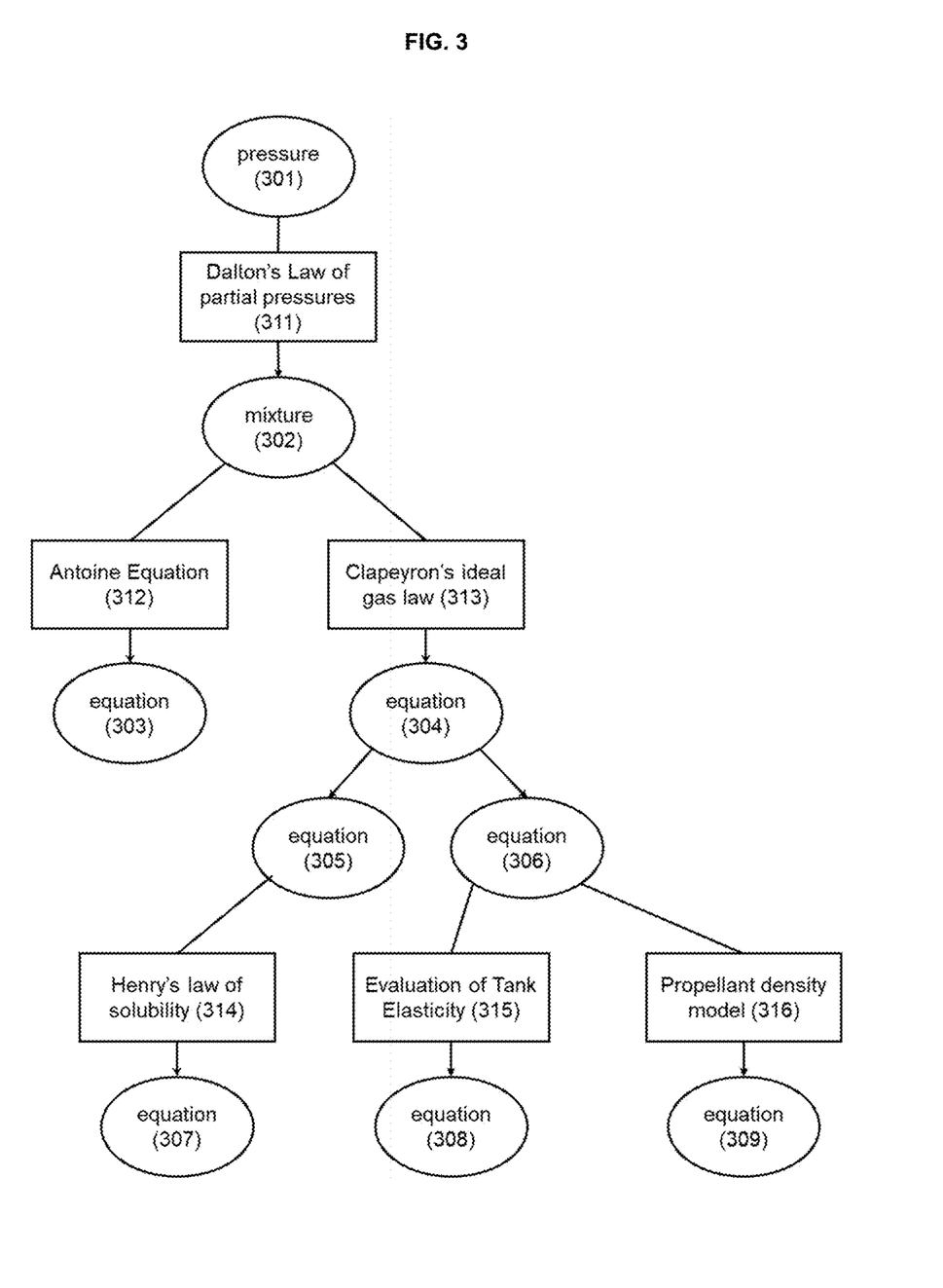
FIG. 3 shows a sequence of equations based on the physico-chemical laws that govern the behavior of pressurized propellants in the respective tanks. With this sequence it is possible to obtain the pressure value found if there is a certain mass of propellant in the tank under a control temperature.

Dalton's Law of Partial Pressures (311) states that the total pressure in the tank is the sum of the partial pressures of the gases in the mixture (302): $P=P_V+P_G$.

Being the tanks are closed containers and under isothermal condition, Clausius-Clapeyron shows the equilibrium point of the evaporation rate as a function of the partial pressure of the propellant vapor. It also shows that increasing the temperature raises the evaporation rate and therefore raises the partial pressure of the propellant vapor and its participation in the mixture of gases present in the free volume of the tanks (U). Several semi-empirical models can be used. In the present patent application, the relations is represented using the Antoine Equation (312), resulting in equation (303):

$$P_V = 10^{\left(A - \frac{B}{(C+T)}\right)},$$

whose coefficients A, B and C are obtained by experimental means and are available in literature for various liquids.

Clapeyron's ideal gas law (313) can be applied to the partial pressure of the pressurizing gas. From this equation it can be seen that the partial pressure ($P_G$) is related to the amount of pressurizing gas ($n_G$) in the free volume (U) according to equation (304):

$$P_G = \frac{n_G RT}{U}.$$

It should be considered that part of the total pressurizing gas in the tank ($n_{He}$) is dissolved in the propellant liquid. Let ($n_S$) be the part of the pressurizing gas dissolved and ($n_G$) be the part of the pressurizing gas present in the free volume, we have equation (305): $n_G = n_{He} - n_S$ Henry's Law of solubility (314) describes that the amount of pressurizing gas dissolved ($n_S$) is directly proportional to the partial pressure over the liquid ($P_G$) and the parameter (Z). Semi-empirical relations between this parameter and the temperature variation can be found in the literature. In general, the consumption of propellant liquid and the increase in temperature tend to decrease the solubility of the pressurizing gas in the propellant liquid, increasing the amount of matter of pressurizer in the free volume ($n_G$). Mathematically, this leads to equation (307): $n_S = n_{He} \cdot Z(T) \cdot P_G$ To calculate the free volume (U) simply subtract the total volume of the tank (V) from the volume occupied by the propellant liquid. The propellant volume can be calculated by dividing the mass of propellant available by its density ($\rho$). That is, one has the equation (306): $U = V - M/\rho$. Therefore, the free volume (U) of tank (105) is expected to increase with the consumption of oxidant (103) and the free volume (U) of tank (106) is expected to increase with the consumption of fuel (104).

In order to obtain greater accuracy in the results, it is important to evaluate the elasticity of the tank (315), which changes the total volume of the tank (V) as a function of the internal pressure (P) based on the elasticity parameter (e). For this purpose, there is the equation (308): $V = V_0 + e \cdot P$.

Higher accuracy is also obtained when using a propellant density model (316) that considers the influence of temperature, such as equation (309): $\rho = \rho_0 + \rho_1 \cdot T + \rho_2 \cdot T^2$.

With this set of equations shown in FIG. 3, it is possible to calculate the pressure (P) by knowing the propellant mass (M) and the control temperature (T) by solving the following second-degree equation:

$$[e]P^2 + [v - e \cdot P_V(T)]P + [-v \cdot P_V(T) - n_{He}RT] = 0 \quad (71)$$

$$v = \left(V_0 - \frac{M}{\rho(T)} - n_{He} Z(T) RT\right)$$

It is worth noting that, when disregarding the elasticity of the tank and the variation of the dissolubility of the gas in the liquid, the above equation can be simplified to the ideal gases' equation applied on Dalton's law of partial pressures:

$$\begin{Bmatrix} e \to 0 \\ Z \to 0 \end{Bmatrix} \Rightarrow P = \frac{n_{He}RT}{U} + P_V(T) \quad (72)$$

Figure 4A:
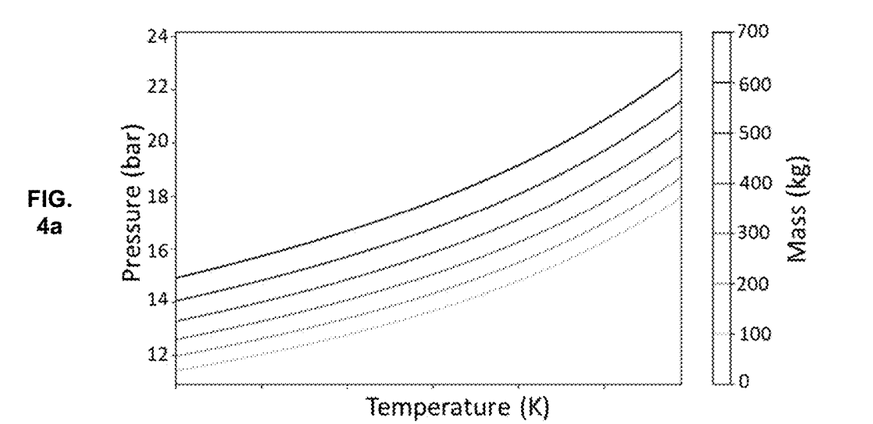
Figure 4B:
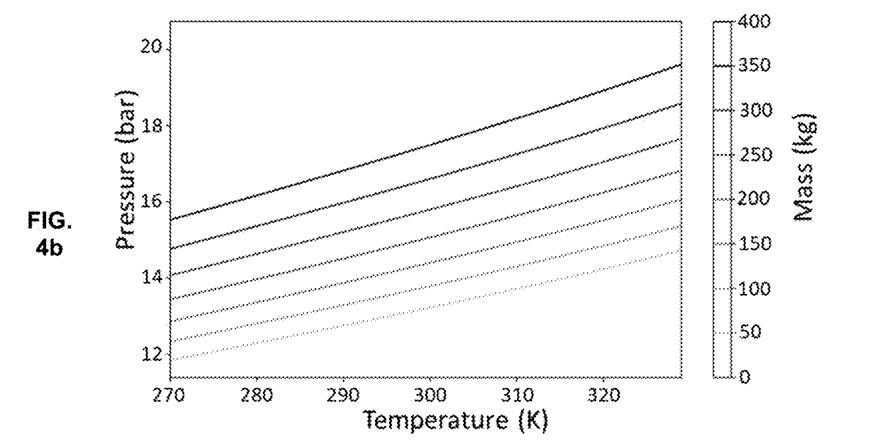

From this relation, it is observed that the internal pressure of the tank is altered by changing the control temperature through the action of a heating system. Having one heating system (107) for controlling tank's (105) temperature and another heating system (108) for controlling tank's (106) temperature, distinct and independent of each other, it is possible to obtain several pressure pairs in the propellant tanks. FIG. 4a shows an example for the oxidizer (MON-1) and FIG. 4b shows an example for the fuel (MMH), evidencing the distinct increase in pressure (P) for an increase in temperature (T) with various amounts of available propellant (M).

Considering mainly the heating by the electronic systems of the space system, the heating by solar irradiation, as well as the irradiation losses to space, the tanks naturally tend to a thermal equilibrium configuration with slight daily oscillations and annual oscillations.

Since the two heating systems (107) and (108) are distinct and independent of each other, it is possible to make the propulsion system operate at higher temperatures than the natural equilibrium temperatures. By setting the heating system to a desired temperature range, the system is able to turn on heaters that will provide heat to the tanks, warming them up. When the upper limit of the set temperature range is reached, the system turns off the heater, causing the tank to slowly lose heat, lowering its temperature. This occurs until the temperature reaches the lower end of the set range, when the system turns the heater back on to maintain the temperature of the propellants within the desired temperature range.

Depending on the configuration of the tanks on the platform of the space system, it is possible that both have a certain thermal coupling. That is, due to the heat transmission between one tank and another, both by conduction and by irradiation, there is a tendency for both tanks to reach natural equilibrium temperatures close to each other.

Hence, it is possible to set each tank to a temperature range distinct from the other, but due to thermal coupling it is difficult to maintain a significant temperature difference.

In addition, the heat losses of the tanks increase with increasing tank temperatures. Thus, due to the limited power of the heaters (107) and (108), one should consider that a given heating system is capable of raising the temperatures of the propellants up to a maximum limit.

Step 1—Obtaining the Pressure Versus Temperature Relations-P(T)

Several parameters of the propellants used in the equations of FIG. 3 and which are consolidated in equation (71) can be found in the literature. Results for hydrazine fuels and nitric acid/nitrogen tetroxide oxidizers are found, respectively, in USAF Propellant Handbooks Volumes 1 and 2. But the subsystem specific parameters, such as the amount of pressurizing gas ($n_{He}$) and the elasticity parameter of the tanks (e), should be obtained experimentally and preferably supplied by the manufacturer.

Let ($K_M$) be the subsystem parameter vector: $K_M = (n_{he}, e)$

For the space system operator, it is possible to estimate the subsystem parameter vector ($K_M$) with the telemetry data following the flow chart proposed in Step 1 of FIG. 2. This allows to obtain results compatible with the behavior of the space system after launch.

The implementation presented here is based on the qualitative model of equation (71) equated to the free volume in tanks (U). This results in the following model, which relates the propellant mass (M) to the variables $\alpha$, $\beta$ and $\gamma$. These variables are calculated from the pressure (P) and temperature (T) data using the already known propellant parameters ($\rho$ (T), $P_V$ (T), Z (T)).

$$\begin{cases} U_0 = (V_0 + e \cdot P) - \dfrac{M}{\rho(T)} \\ U_0 = n_{He}\left[\dfrac{RT}{P - P_V(T)} \cdot (1 - Z(T)(P - P_V(T)))\right] \end{cases} \Rightarrow \quad (82)$$

$$\Rightarrow M = n_{He} \cdot \alpha(P, T) + e \cdot \beta(P, T) + \gamma(T)$$

Considering small variations of pressure and temperature around the operation point and considering the low sensitivity of the propellant's parameters to the variation of these variables, it is possible to estimate the subsystem parameter vector ($K_M$) using, for example, the least squares method from the mass, pressure and temperature data.

In the Sub-step of Data Acquisition (211) of Step 1, the operator must obtain the telemetry data pressure ($\tilde{P}$), temperature ($\tilde{T}$) and remaining mass ($\tilde{M}$) for each of the propellant tanks. To do so, simply access the space system's telemetry database and prepare the obtained data for analysis. In addition to deleting corrupted data, the preparation mainly consists of synchronizing the telemetry data. That is, one must "fill forward" the instants without data with the last available data. Thus, three synchronized sets with the same number of data are obtained, allowing the analysis by the subsequent Sub-steps.

In the Sub-step of Defining the Metric (212) of Step 1, the operator must calculate a mass estimate ($M_0$) based on any initial values for the parameter vector ($K_M$) and the values of $\alpha$, $\beta$ and $\gamma$. These values are calculated according to equation (82) using the telemetry data prepared in the previous Sub-step.

In the Sub-step of Parameter Estimation (213) of Step 1, the operator must minimize the errors found in the estimate ($M_0$) by changing the parameter values in the vector ($K_M$). Using any parameter estimation method, for example the least squares method, the vector of estimators ($K_M^*$) is obtained.

In the Sub-step of Relation Evaluation (214) of the Step 1, the operator must evaluate the predictive ability of this relations. To do so, he should use the vector of estimators ($K_M^*$) estimated from the telemetry data of a given period to predict the pressure (P*) of the next period by solving equation (71). This prediction should be compared with the telemetry value of pressure ($\tilde{P}$). For example, the operator can evaluate the adherence of the result by looking at the mean square error and the coefficient of determination $r^2$.

Figure 5A:
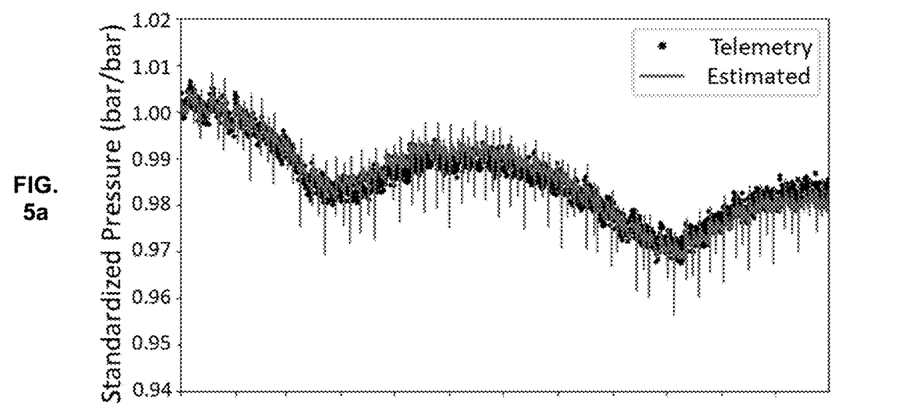
Figure 5B:
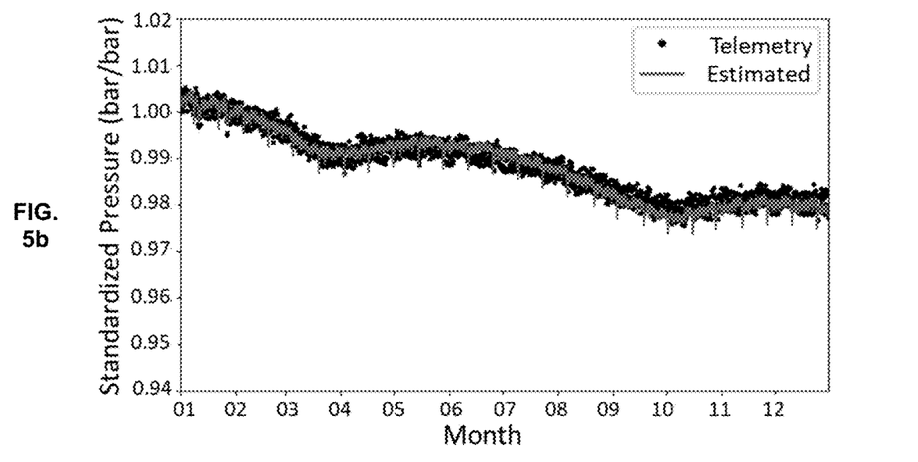

FIG. 5 shows precisely the values of the pressure telemetry ($\tilde{P}$) obtained over a 1-year period compared to the pressure prediction (P*) for this period. The pressure prediction is calculated from the temperature ($\tilde{T}$) and mass ($\tilde{M}$) telemetry of the evaluated year and with the best estimator of the parameter vector ($K_M^*$) estimated with the telemetry data of the previous year. In this example, the coefficient of determination approaches $r^2$=0,93.

It is emphasized that the implementation shown here is only one of the possibilities for the solution proposed in the patent application. Any implementation that includes identifying any set of parameters from the equations listed in FIG. 3 and contained in equation (71) using a set of pressure, temperature, and mass telemetry from the propellant tanks is within the scope of the present patent application.

Theoretical Foundation for Step 2

In addition to the identification of the subsystem parameters in Step 1, FIG. 2 shows in its Step 2 a sequence of sub-steps in order to obtain coefficients that characterize the propulsion performance. As previously stated, the propulsion performance can be predicted using empirical relations provided by the manufacturer. Among them, the relations between the mixture ratio ($MR_P$) and the pressures in the propellant supply lines (p) are of interest in the present patent application.

However, several factors contribute to the observed results not being in accordance with the nominal value. Thus, a set of parameters can be estimated and used to relate these quantities.

Step 2—Obtaining the Mixture Ratio Relation as a Function of Pressure—RM(P)

Consider, as an example, the qualitative model: $MR_P = a \cdot P_{OX}^2 + b \cdot P_{OX}^2 + c \cdot P_{CO} + d \ P_{CO}^2 + e \cdot P_O \cdot P_{CO}$, being $P_{OX}$ (oxidizer pressure) and $P_{CO}$ (fuel pressure), equation (92).

Let ($K_{MR}$) be the thrust parameter vector: $K_{MR}$=(a, b, c, d, e).

Considering that both valves in the oxidizer line (109) and fuel line (110) operate simultaneously, the mixture ratio can also be calculated by relating both mass consumptions every time the system was used, such that: $MR_M = \Delta M_{OX}/\Delta M_{CO}$ Knowing both ways of obtaining the mixture ratio, it is possible to obtain the best estimate of the parameter vector ($K_{MR}$) for the mass consumption results ($MR_M$) and use them to predict the mixture ratio as a function of pressure ($MR_P$).

In the Sub-step of Data Acquisition (221) of Step 2, the operator must obtain the telemetry data of the pressures in the supply lines ($\tilde{p}$) and the mass consumption of both propellants for each use of the propulsion system ($\Delta \tilde{M}$). This can be done by accessing the telemetry database of the space system and preparing the obtained data for analysis. In addition to eliminating corrupted data, the preparation mainly consists of synchronizing the telemetry data. That is, one must "fill forward" the instants without data with the latest available data. Thus, two synchronized sets with the same number of data are obtained, allowing for analysis by subsequent Sub-steps.

In the Sub-step of Metric Definition (222) of Step 2, the operator must relate the consumption data obtained by telemetry ($\Delta \tilde{M}$) and calculate the Mixture Ratio ($\widetilde{MR}_M$), such that: $\widetilde{MR}_M = \Delta \tilde{M}_{OX}/\Delta \tilde{M}_{CO}$.

Also, in the Sub-step of Metric Definition (222) of Step 2, the operator must calculate an estimate of the mixture ratio ($\widetilde{MR}_P$) based on any initial values of the parameter vector ($K_{MR}$) using the telemetry data of the pressures in the supply lines ($\tilde{p}$).

In the Sub-step of Parameter Estimation (223) of Step 2, the operator must minimize the errors found between the estimate ($\widetilde{MR}_P$) and the measured value ($\widetilde{MR}_M$) by changing the values of the parameters vector ($K_{MR}$). Using, as an example, the least squares method, the vector of estimators ($K_{MR}^*$) is obtained. The estimation should be done by separating the telemetries into groups of conditions of use of the same type of thruster sets.

In the Sub-step of Relation Evaluation (224) of Step 2, the operator must evaluate the predictive ability of this relations. To do so, it should use the propulsive estimators vector ($K_{MR}^*$) estimated from the telemetry data of a given period to predict the mixture ratio ($\widetilde{MR}_P$) of the following period by applying equation (92). This prediction should be compared with the value of the reference mixture ratio ($\widetilde{MR}_M$). For example, the operator can evaluate the adherence of the result by looking at the root mean square error and the coefficient of determination $r^2$.

Theoretical Foundation for Step 3

Once Steps 1 and 2 are completed, the operator has the ability to predict the mixture ratio based on pressure values by using the best estimate of the propulsion parameters vector ($K_{MR}^*$) and the ability to predict the pressure based on temperature and mass values by using the best estimate of the subsystem parameter vector ($K_M^*$). That is, the operator can calculate the mixture ratio (MR) as a function of the propellant tank setting temperatures (T).

On the other hand, Step 3 allows the operator to identify the temperature ($T_A$) that conditions the propulsion system to operate under a given mixture ratio of interest ($MR_I$). For this purpose, Step 3 is based on the recursive evaluation of the obtained mixture ratio for a given temperature. That is, Step 3 "inverts" the order of the relation previously obtained.

If the propulsion system operates at a mixture ratio equal to the ratio of available masses in the propellant tanks, both propellants will be depleted simultaneously, minimizing waste and maximizing the availability of this space system.

Therefore, Step 3 allows the operator to identify under which temperature the space system will operate optimally, from the point of view of propellant use.

Step 3—Obtaining the Temperature to be Set for Mixture Ratio Control

The operator should enter as Input (231) of Step 3 the value of mixture ratio of interest ($MR_I$).

From any initial temperature value, the Sub-step of Pressure Estimation (232) of Step 3 calculates the pressure in the tanks under that temperature.

From the calculated pressure value, the mixture Sub-step of Ratio Estimation (233) of Step 3 calculates the mixture ratio of the propellant under that pressure.

Then, the Sub-step of Error Minimization (234) of Step 3 evaluates whether the calculated mixture ratio is equal to the mixture ratio of interest ($MR_I$). If it evaluates negatively, the Error Minimization (234) Sub-step of Step 3 defines another temperature to be tested and restarts the search from Sub-step (232) of Step 3. If it evaluates positively, the temperature to be set ($T_A$) is displayed in Output (235) of Step 3. For the Sub-step of Error Minimization (234) of Step 3, it is recommended to implement numerical methods (bisection, Newton, Brent etc.) that allow minimizing the error function: $erro(T) = MR_I - MR(T)$.

Note that the Sub-step of Pressure Estimation (232) of Step 3 and the Sub-step of mixture Ratio Estimation (233) of Step 3 are adaptations of the Sub-step of Relation Evaluation (214) of Step 1 and the Sub-step of Relation Evaluation (224) of Step 2, respectively, for the recursive search application performed in Step 3.

Method Application Examples

Figure 6:
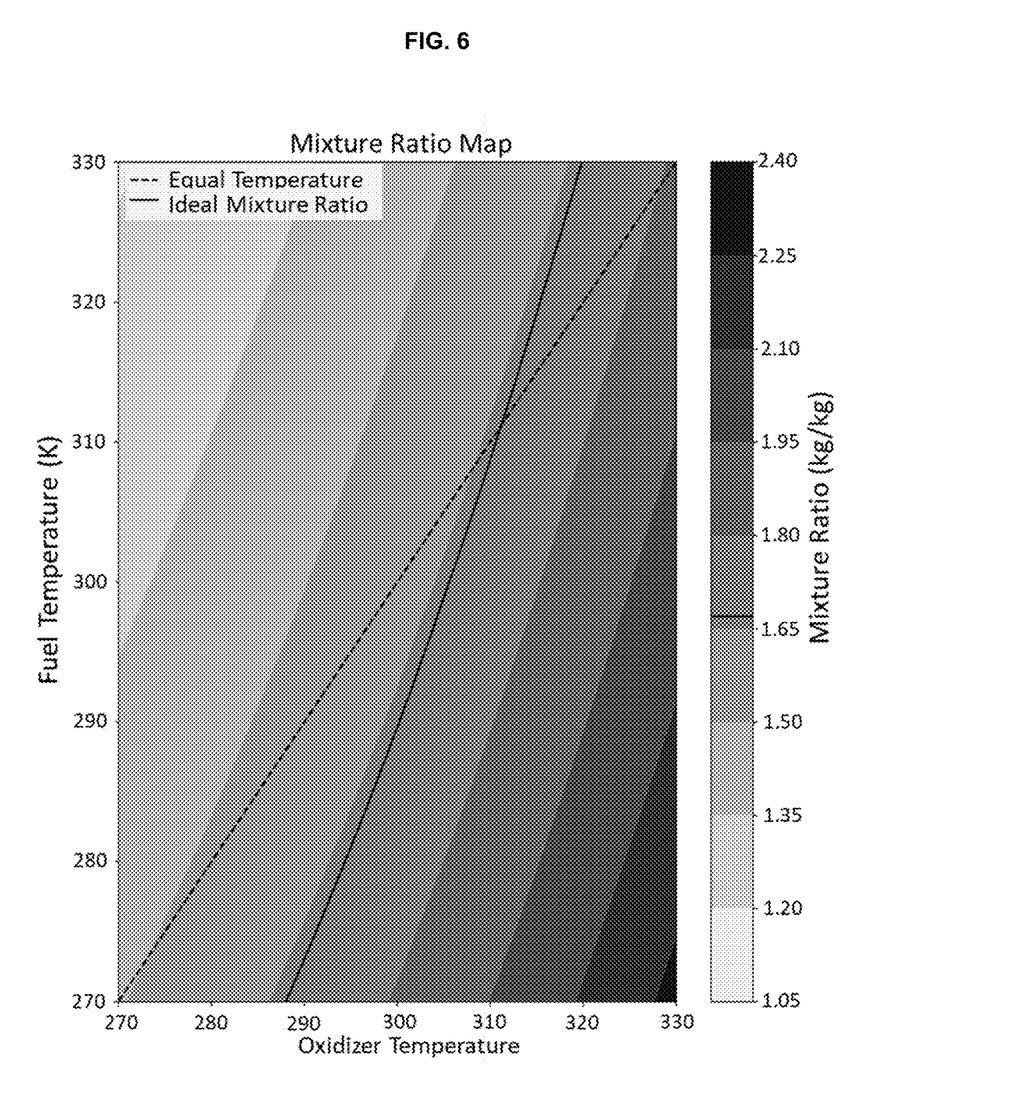
FIG. 6 shows a graph evidencing the result of the applied method for a given configuration of propellant mass.

FIG. 6 summarizes the application of the innovation method for a given propellant configuration in the SGDC. In this case, it is observed that depending on the temperature pair set in the thermal control systems, the propulsive system will operate with a given mixture ratio. It is possible to identify in this temperature map the optimal operating conditions for a consumption mixture ratio equal to a ratio of propellants available in the tanks (solid line). That is, any pair of temperatures on this line will provide the propulsion system with a pressure such that it operates at the desired mixture ratio. Given the thermal coupling between the propellant tanks mentioned above, it is therefore recommended to use a temperature pair close to the equal temperature line (dashed line). Thus, it is identified that the optimal operating temperature is T=311,2K.

As an example of the benefits of applying the Method of the present patent application, a comparison with another method based on the optimization of propulsive efficiency, called here the Comparison Method, is presented from now on.

For this comparison both methods share the sub-steps that comprise Step 1. Specifically, both methods start with the estimation of parameters that relate the pressure and temperature in the propellant tanks using the telemetry data obtained from the space system database, according to Sub-steps (211), (212), (213), and (214) that comprise Step 1.

The comparison Method builds on this common basis a step for the optimization of the specific impulse, suitable, for example, for a monopropellant propulsion system. This step keeps intrinsic differences to Step 3 presented in the present patent application. In the present patent application, the step for the optimization of the mixture ratio, more suitable for a bipropellant propulsive system, is built on this common base. In the present patent application, it is the Sub-steps (221), (222), (223), (224) of characterization of the propulsion system that compose Step 3.

Figure 7A:
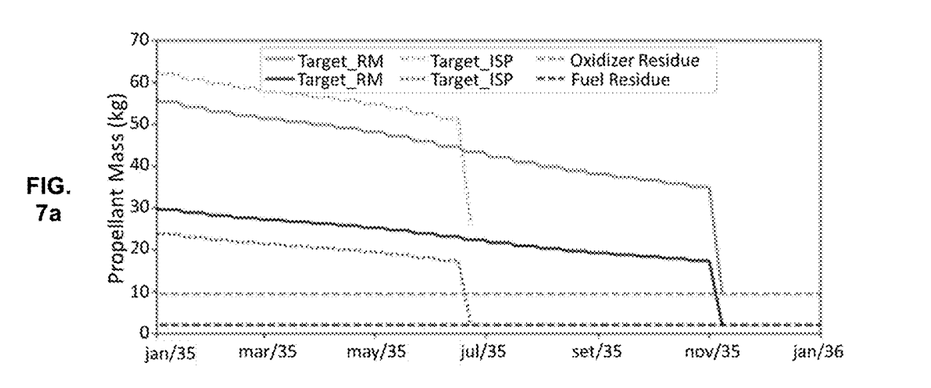
FIG. 7 shows a set of plots of the physical quantities of the propulsion system in simulations of SGDC operation from 2020 onwards in which thermal actuation follows either optimization for specific impulse (Target_ISP) or optimization for the mixture ratio (Target_MR).

The differences between the methods are proven by the results presented in FIG. 7. Using the actual telemetry data from the SGDC until early 2020 to estimate the necessary parameters, two simulations were performed predicting the values of the physical quantities to be obtained during the operation of the SGDC over time until its end of life.

The simulation called Target_ISP performs the thermal actuation on propellant tanks according to the comparison Method, that is, it seeks the highest combustion efficiency and consequently, the lowest propellant consumption.

The simulation called Target_MR performs the thermal actuation on the propellant tanks according to the Method of the present patent application, that is, it seeks to maintain the mixture ratio of propellants consumed equal to the ratio of propellants available in the tanks.

Figure 7B:
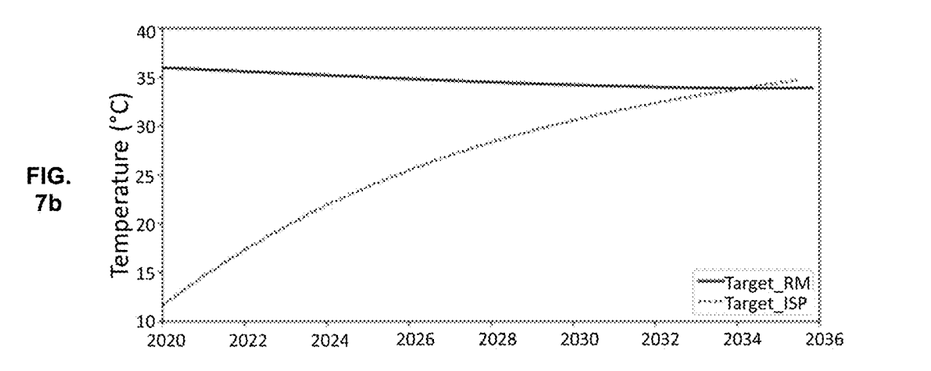
Figure 7C:
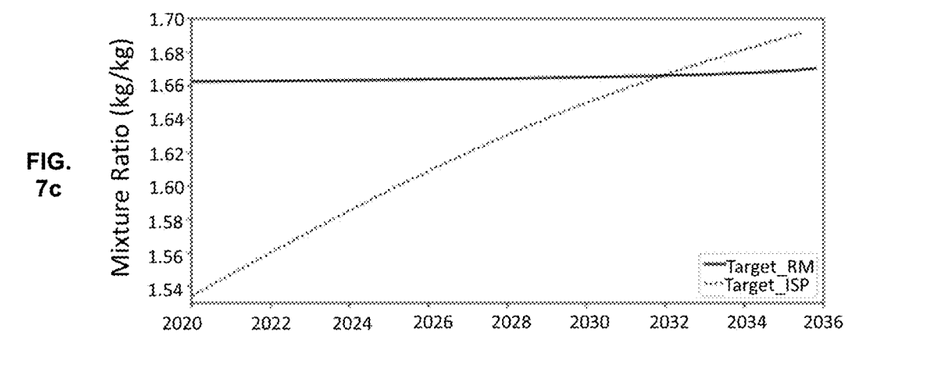

FIG. 7b highlights the differences in thermal performance between the two methods. Therefore, the methods result in different temperatures to be adjusted.

FIG. 7a shows the amount of oxidizer (gray) and fuel (black) obtained for each of the simulations. The dashed lines show the static residual for each propellant type (the amount of propellant that is not able to be extracted because it remains trapped in the pipes and tank walls). The last propellant mass drop represents the last maneuver performed by the space system, i.e., its end-of-life maneuver.

The application of the comparison Method during the Target_ISP simulation results in the highest burn efficiency and therefore a lower propellant consumption at each maneuver. For example, the total mass available before the last maneuver is 57 kg, 1 kg more than that obtained on this same date in the Target_MR simulation. But since this method has no focus on bipropellant systems, its application leads to the exhaustion of one of the propellants before the other, resulting in a surplus (called dynamic residue) of 17 kg of oxidant at the end of the last maneuver.

For the Target_MR simulation, on the other hand, the thermal actuation is performed on the tanks in order to maintain the mixture ratio of the propulsion system with a value equal to the ratio of propellants available in the tanks. This can be seen in FIG. 7c, where the Target_MR simulation results in a nearly constant mixture ratio while the Target_ISP simulation results in a lower mixture ratio (fuel rich), leading to early fuel depletion. In the Target_MR, simulation, the performance of each maneuver is slightly impaired due to the lower specific impulse (Isp), but this loss is far outweighed by the use of virtually all the available propellant in both tanks. According to this simulation, the dynamic residual would be less than 1 kg.

Considering that end-of-life is reached when the available mass in one of the propellant tanks is depleted, the Target_MR simulation shows a predicted end-of-life in early November 2035, four months later than the predicted end-of-life of the Target_ISP simulation, in mid-June 2035. Due to the high costs associated with the availability of space systems, this difference can mean significant gains for its operator.

Method Validity Conditions

Although equations (71) and (92) seek to incorporate as much as possible of the physical relations found within the tanks and the propulsion characteristics, it is important to consider certain conditions of validity for the analysis of this present patent application. During Steps 1 and 2 in FIG. 2, parameter identifications will be better the more data is available and the more accurate the sensors in the space system. In addition, the operator should be cautious about extrapolating the data far beyond the operating condition at which he obtained the data, as the parameters may not behave in the same way as they were estimated. Finally, the dynamics of the system are expected to change over time, and therefore the operator should exercise caution when using parameters identified in a period well before their use in the context of the present patent application.

The invention claimed is:

1. A method for controlling a mixture ratio of propellant consumption for a space system, the space system comprising a bipropellant propulsion system operating in blowdown mode and having a respective sensor array communicating with a respective one of the propellant tanks, the propellant tanks each having an independent thermal control system and a respective supply line to connect each of the propellant tanks to an engine, comprising the steps of:
   a) reading temperature and propellant mass in each of the propellant tanks, and pressure in the respective supply line, by the respective sensor array; and
   b) operating each independent thermal control system by:
      i) carrying out Data Acquisition (211) by a telemetry system that receives real time data of the temperature in each of the propellant tanks, the propellant mass in each of the propellant tanks, and the pressure in each of the supply lines read by the sensor arrays, and defining a Metric Definition (212), a Parameter Estimation (213), and a Relation Evaluation (214) by a computational tool communicating with the telemetry system, wherein the computational tool generates a relation P(T) of the pressure as a function of the temperature in the propellant tanks;
      ii) carrying out Data Acquisition (221) by the telemetry system that receives real time data the of propellant mass in each of the propellant tanks and of the pressure in the propellant tanks from the sensor array, and defining a Metric Definition (222), a Parameter Estimation (223), and a Relation Evaluation (224) by the computational tool, wherein the computational tool generates a relation MR(P) of mixture ratio as a function of the pressure in the propellant tanks; and
      iii) Receiving Input Data (231) by the computational tool that receives a Mixture Ratio of Interest ($MR_I$), and generating a Pressure Estimation (232), a Mixture Ratio Estimation (233), and an Error Minimization (234) by the computational tool using both of the relations P(T) and MR(P) from steps i) and ii), in a recursive manner, resulting in a direct relation MR(T) of mixture ratio as a function of temperature, wherein the computational tool inverts the relation MR(T) by applying a search algorithm to generate an inverse relation T(MR) of temperature as a function of mixture ratio, whereby the computational tool applies the Mixture Ratio of Interest ($MR_I$) to the relation T(MR), generating a propellant tank temperature ($T_A$) to be set in the propellant tanks, and outputting (235) the propellant tank temperature ($T_A$) in a display embedded in the space system,
   wherein the independent thermal control systems act thermally on the propellant tanks, adjusting the temperature (T) to the propellant tank temperature (TA) in the propellant tanks, allowing the bipropellant propulsion system to operate at the Mixture Ratio of Interest ($MR_I$), thereby causing a difference between an Adjusted Mixture Ratio ($MR_A$) and the Mixture Ratio of Interest ($MR_I$) to approach zero.

2. The method for controlling a mixture ratio according to claim 1, wherein the method is implemented by means of a computer program operating on computer hardware.

3. The method for controlling a mixture ratio according to claim 1, wherein;
   steps b)i) and b)ii) are carried out independent of each other, wherein the relations P(T) and MR(P) are calculated in a manner selected from the group consisting of: a) sequentially; b) simultaneously; and c) with the beginning of either of steps b)i) and b)ii) without regard to the conclusion of the other step if previously started; and
   step b)iii) is only started after the complete fulfillment of both steps b)i) and b)ii).

4. The method or controlling a mixture ratio according to claim 1, wherein the relations are based on the physical-chemical behavior of propellants in the propellant tanks and on the propulsive characteristics of the bipropellant systems, and wherein parameters fit the relations to real telemetry data developed by the telemetry system.

5. The method for controlling a mixture ratio according to claim 1, wherein in step b)i), the telemetry system acquires the real data of pressure ($\tilde{P}$), temperature ($\tilde{T}$) and remaining mass ($\tilde{M}$) for each propellant tank, wherein the computational tool accesses the real data and prepares the real data for analysis and elimination of corrupted data, and synchronizes the real data acquiring three synchronized sets with the same number of data, allowing the analysis by subsequent steps of step b)i).

6. The method for controlling a mixture ratio according to claim 5, wherein, in the step of Defining the Metric (212) of step b)i), the computational tool calculates a mass estimate ($M_0$) based on any initial values for a parameter vector ($K_M$) and $\alpha$, $\beta$ and $\gamma$, using the real data prepared in the step of Data Acquisition (211) of step b)i), according to the equation:

$$\left\{ \begin{array}{l} U_0 = (V_0 + e \cdot P) - \dfrac{M}{\rho(T)} \\ U_0 = n_{He}\left[ \dfrac{RT}{P - P_V(T)} \cdot (1 - Z(T)(P - P_V(T))) \right] \end{array} \right\} \Rightarrow$$

$$\Rightarrow M = n_{He} \cdot \alpha(P, T) + e \cdot \beta(P, T) + \gamma(T)$$

where P is the pressure in the tank, T the temperature in the tank, M the mass of propellant available, U the free volume in the tank, $V_0$ the initial volume of the tank, e the coefficient of elasticity of the tank, ρ the density of the propellant, $n_{he}$ the number of moles of pressurizing gas, R the universal gas constant, $P_v$ the vapor pressure and Z the solubility coefficient.

7. The method for controlling a mixture ratio according to claim 6, wherein in the step of Parameter Estimation (213) of step b)i), the computational tool minimizes errors in the mass estimate ($M_0$) by changing the parameter values in the vector ($K_M$) and obtaining a vector of estimators ($K_M$*), by using any parameter estimation method.

8. The method for controlling a mixture ratio according to claim 7, wherein in the step of Relation Evaluation (214) of step b)i), the computational tool evaluates the predictive ability of this relation using the vector of estimators ($K_M$*) estimated from the real data of a given period to predict a pressure (P*) of the following period by solving the equation:

$$[e]P^2 + [v - e \cdot P_V(T)]P + [-v \cdot P_V(T) - n_{He}RT] = 0$$

$$v = \left(V_0 - \dfrac{M}{\rho(T)} - n_{He}Z(T)RT\right)$$

where P is the pressure in the tank, T the temperature in the tank, M the mass of propellant available, U the free volume in the tank, $V_0$ the initial volume of the tank, e the coefficient of elasticity of the tank, ρ the density of the propellant, $n_{he}$ number of moles of pressurizing gas, R the universal gas constant, $P_v$ the vapor pressure and Z the solubility coefficient, so the computational tool compares the predicted pressure (P*) with the pressure ($\tilde{P}$) of the real data.

9. The method for controlling a mixture ratio according to claim 1, wherein, in the step of Data Acquisition (221) of step b)ii), the telemetry system acquires the real data of the pressures ($\tilde{p}$) in the supply lines and the mass consumption of both propellants for each use of the propulsion system ($\Delta \tilde{M}$) from the respective sensor array, and for that, the computational tool accesses the real data and prepares the real data for analysis, and for that, the computational tool synchronizes the real data, acquiring two synchronized sets with the same number of data, allowing the analysis by the subsequent steps of step b)ii).

10. The method for controlling a mixture ratio according to claim 1, wherein in the step of Metric Definition (222) of step b)ii), the computational tool relates a consumption mass ($\Delta \tilde{M}$) of the real data and calculates a Mixture Ratio ($\widetilde{MR_M}$), where: $\widetilde{MR_M} = \Delta \tilde{M}_{ox} / \Delta \tilde{M}_{co}$, whereby the computational tool calculates an estimate of a mixture ratio ($\widetilde{MR_P}$) based on any initial values of a parameter vector ($K_{MR}$) using the real data of the pressures ($\tilde{p}$) in the supply lines, and applying the equation $MR_P = a \cdot P_{OX} + b \cdot P_{OX} + c \cdot P_{CO} + d \cdot P_{CO}^2 + e \cdot P_{OX} \cdot P_{CO}$, where $P_{OX}$ is the pressure in an oxidizer tank, $P_{CO}$ is the pressure in a fuel tank and a, b, c, d, and e are parameters of the equation to be estimated.

11. The method for controlling a mixture ratio according to claim 10, wherein, in the step of Parameter Estimation (223) of step b)ii), the computational tool minimizes errors between the estimate ($\widetilde{MR_P}$) and the measured value ($\widetilde{MR_M}$) by changing the values of the parameter vector ($K_{MR}$) and obtaining a vector of estimators ($K_{MR}$*), wherein the computational tool separates the real data into groups of conditions of use of the same type of thruster sets.

12. The method for controlling a mixture ratio according to claim 11, wherein, in the step of Relation Evaluation (224) of step b)ii), the computational tool evaluates the predictive ability of this model, and for that, the computational tool uses the vector of estimators ($K_{MR}$*) estimated from the real data of a certain period to predict the mixture ratio ($\widetilde{MR_P}$) of the following period applying the equation $MR_P = a \cdot P_{OX} + b \cdot P_{OX} + c \cdot P_{CO} + d \cdot P_{CO}^2 + e \cdot P_{OX} \cdot P_{CO}$, where $P_{OX}$ is the pressure in the oxidant tank, $P_{CO}$ is the pressure in the fuel tank and a, b, c, d, and e are the parameters of the equation to be estimated, and the computational tool compares the predicted mixture ratio ($\widetilde{MR_P}$) with the value of the reference mixture ratio ($\widetilde{MR_M}$).

13. The method for controlling a mixture ratio according to claim 7, wherein by completing b)i) and b)ii), the computational tool predicts the mixture ratio based on pressure values by the best estimate of the propulsion parameters vector ($K_{MR}$*) and predicts the pressure based on temperature and mass values by means of the best estimate of the subsystem parameter vector ($K_M$*), so the computational tool calculates the mixture ratio (MR) as a function of the propellant tank setting temperatures (T).

14. The method for controlling a mixture ratio according to claim 1, wherein the step of Receiving Input Data (231) of step b)iii) with the value of the mixture ratio of interest ($MR_I$) is conducted by the computational tool.

15. The method for controlling a mixture ratio according to claim 1, wherein, in the step of Pressure Estimation (232) of step b)iii), the computational tool calculates a pressure in the propellant tanks under any initial temperature value.

16. The method for controlling a mixture ratio according to claim 15, wherein, in the step of Mixture Ratio Estimation (233) of step b)iii), the computational tool calculates the mixture ratio of the propulsion under the pressure value calculated in the step of Pressure Estimation (232) of step b)iii).

17. The method for controlling a mixture ratio according to claim 16, wherein, in the step of Error Minimization (234) of step b)iii), the computational tool evaluates whether the calculated mixture ratio is equal to the mixture ratio of interest ($MR_I$), where in case of negative evaluation, the computational tool defines another temperature to be tested and restarts the step of Pressure Estimation (232) of step b)iii) and in case of positive evaluation, the display presents a propellant tank temperature ($T_A$) in the step of outputting (235) of step b)iii).

18. The method for controlling a mixture ratio according to claim 17, wherein, for the step of Error Minimization (234) of step b)iii), the computational tool implements numerical methods that allow minimizing the error function: $\mathrm{erro}(T) = MR_I - MR(T)$.

19. The method for controlling a mixture ratio according to claim 1, wherein the step of Pressure Estimation (232) of step b)iii) and the step of Mixture Ratio Estimation (233) of step b)iii) are adaptations of the step of Relation Evaluation (214) of step b)i) and the step of Relation Evaluation (224) of step b)ii), respectively, for the step b)iii) performed by the computational tool, in the recursive manner.

\* \* \* \* \*